(12) United States Patent
Bekrenev

(10) Patent No.: US 6,655,911 B2
(45) Date of Patent: Dec. 2, 2003

(54) STATOR VANE FOR AN AXIAL FLOW TURBINE

(75) Inventor: Igor Bekrenev, Moscow (RU)

(73) Assignee: Alstom (Switzerland) Ltd, Baden (CH)

( * ) Notice: Subject to any disclaimer, the term of this patent is extended or adjusted under 35 U.S.C. 154(b) by 87 days.

(21) Appl. No.: 10/014,399

(22) Filed: Dec. 14, 2001

(65) Prior Publication Data

US 2002/0127101 A1 Sep. 12, 2002

(30) Foreign Application Priority Data

Dec. 28, 2000 (RU) .......................................... 00133223

(51) Int. Cl.[7] ................................................. F01D 9/04
(52) U.S. Cl. ...................... 415/116; 415/189; 415/209.3
(58) Field of Search ................... 415/116, 189, 415/191, 208.2, 209.3, 209.4, 210.1; 416/204 A, 244 R, 244 A

(56) References Cited

U.S. PATENT DOCUMENTS 5,482,433 A * 1/1996 Norris et al. ......... 415/210.1 X

FOREIGN PATENT DOCUMENTS

RU          2038487         6/1995

OTHER PUBLICATIONS

A. V. Shtoda et al. "Konstukcija aviazionnych dwigatjeljei", Zhukovsky Military Aircraft Engineering Academy 1958, p. 141.

* cited by examiner

*Primary Examiner*—Edward K. Look
*Assistant Examiner*—Richard A. Edgar
(74) *Attorney, Agent, or Firm*—Burns, Doane, Swecker & Mathis, L.L.P.

(57) ABSTRACT

A stator vane in an axial flow turbine can be fixed to the stator casing by means of force-fit attachment elements. The stator vane root has a hollow profile and includes radially inner platform matched to the contour of the flow channel, a radially outer platform matched to the contour of the stator casing, and two essentially parallel sidewalls. The outer platform has at least one hole for the attachment element. In one embodiment, the outer platform is detachably connected to the vane root. In other embodiments, a cavity is formed with vane root walls and with stator casing walls and is essentially tightly sealed from hot gas passing through the flow channel, allowing cooling of the cavity with little coolant loss, and allowing vanes without any seals between platforms and other vane root parts. In another embodiment, bearing surfaces of each vane are provided at different levels.

13 Claims, 7 Drawing Sheets

STATOR VANE FOR AN AXIAL FLOW TURBINE

FIELD OF THE INVENTION

The invention relates to the design of a stator blade for a turbomachine. In particular, it relates to the design of a vane root to provide a detachable connection between the vane body and the stator casing of such a machine by means of attachment elements, preferably screws, which act with a force fit.

BACKGROUND OF THE INVENTION

RU 2038487 C1 discloses a widely used type of attachment for the stator vanes to the stator casing of a multistage turbine. The stator, which encloses a conically expanding flow channel, is composed of a plurality of segments. The inner shell of the stator casing has annular recesses, in which projections on the vane root engage and form a positively locking connection between the stator vane and the stator. This solution makes manufacture of the stator casing complex, owing to its complicated structure, characterized by numerous projections and recesses.

In order to avoid these disadvantages, it is known for the stator and stator vane to be connected by means of attachment screws (A. V. Shtoda et al. Konstukcija aviazionnych dwigatjeljei, Zhukovsky Military Aircraft Engineering Academy 1958, p. 141). The stator vane root is equipped with an expanded region in the form of a plate, for this purpose. The vane is attached to the casing by means of two screws. In comparison with that mentioned above, this proposal allows the stator casing to be constructed in a considerably simplified manner, with a correspondingly reduced manufacturing cost, since it is possible to dispense with the complicated internal structure. The gap in the labyrinth seal can be designed to be narrower, since there is no need for the play required, for production engineering, between the mutually engaging projections and recesses on the stator and stator vane.

However, this solution has the disadvantage that two screws are required to fix the vane securely. The root plate is fixed to the stator by one screw upstream of the vane body in the flow direction, and another downstream of it. This additional space requirement for screw arrangement leads, in the end, to the turbine being undesirably lengthened. Temperature differences between the vane root and the stator casing during non-steady-state process phases result in different thermal expansion of the materials. This leads to undesirable material stresses in the area located between the screws. Finally, the complete vane root including the attachment elements is subjected to the influence of the hot process gases, without any protection. This, on the one hand, increases the amount of heat transferred to the stator, while on the other hand uneven areas on the surface cause disturbances in the channel flow.

SUMMARY OF THE INVENTION

The invention is based on the object of providing a stator vane which allows a simple and reliable screw connection to the stator, while in the process avoiding said disadvantages of the prior art solutions.

The object is achieved according to the invention by designing a stator vane in accordance with the features of claim 1. Advantageous developments of the invention are described in the dependent claims.

The basic idea of the invention is to design the vane root as a hollow profile, comprising two root platforms which are arranged at a distance from one another, and of which the first, radially inner platform is matched to the conical contour of the flow channel, while the second, radially outer platform is matched to the contour of the corresponding casing wall. Two mutually opposite sidewalls connect the root platforms, enclosing a cavity. The outer root platform is preferably equipped with a hole for accommodating an attachment element, preferably an attachment screw, which fixes the stator vane on the wall of the stator casing.

The cavity enclosed by said root platforms and sidewalls provides space to accommodate the attachment elements, as will be explained in more detail in the following text.

The surface of the outer root plate is provided with recesses. When placed against the stator casing, this creates additional cavities, which make it more difficult for heat to be transferred. Alternatively or cumulatively, the inner wall of the stator casing may also have corresponding recesses.

In one alternative embodiment, the outer root platform is not an integral component of the vane root, but is detachably connected to it. In this case, the vane root is formed only by the inner expanded region, which faces the vane body and is in the form of a plate, and the two radially oriented walls which are arranged opposite and whose ends are bent inward at right angles. The steps produced in this way act as contact edges for the outer plate.

In another alternative embodiment, the sidewalls are mutually connected by two partitions so that two walls, the two partitions, the inner root platform, the outer root platform and the cylindrical surface of the stator casing form a cavity. In this case, if the walls and the partitions are tightly fit against the cylindrical casing surface, and this joint is tightened by a screw connection, a sufficiently sealed connection can be created at this joint.

In this case any possible mass flow values of cooling gas can be supplied into this cavity through a channel made in the casing and through the channel in the outer root platform without worrying about large losses due to its leakage into the flow channel. In this case another channel can be made in both the outer platform and the casing to discharge cooling gas from this cavity.

In the third alternative embodiment, bearing surfaces of each vane are implemented at different radial levels and are coupled with different cylindrical surfaces of the casing; in this case two bearing surfaces of two adjoining vanes are situated on the same cylindrical surface of the stator.

This arrangement of vane bearing surfaces makes it possible to reduce heating of one vane root wall due to its withdrawal from the hot zone interlinked with the flow channel, and to reduce heating of the stator end wall conjugated with the vane wall. In the fourth alternative embodiment, sidewalls are arranged along the direction parallel to the longitudinal axis of the stator with their bearing surfaces adjoined to the cylindrical surface and to the end surface of stator casing. Ends of the root inner platform also adjoin the above mentioned surfaces of the stator casing. The fastening element is arranged obliquely with respect to the cylindrical surface and to the end surface of the stator casing, and oriented for simultaneous pressing of the bearing surfaces of the stator casing. This sufficiently seals the cavity from hot gases passing through the gas flow channel is formed between the end surface of stator casing, its cylindrical surface, the vane root inner platform and its two walls.

This makes it possible to cool internal walls of this cavity by any cooling gas mass flows without misgiving occurrence of large losses due to leakages of coolant into the gas flow channel. In this case an outlet channel for discharge of cooling gas from this cavity can be also implemented in the casing. In so doing cooling of the vane root cavity and even vane airfoil internal cavity (if any) virtually without cooling gas losses, and thus a plant efficiency increase is possible.

An important advantage of this embodiment is also the possibility for vane mounting without any seals between platforms and other root parts of vanes, because proposed design of joints between the vane root part and the stator casing allows for virtually complete protection of inner stator surface against effect of hot gases from the turbine gas flow path.

The advantages of the vane root design according to the invention are, in particular, that the heat transferred from the flow channel to the stator is considerably reduced. The gas-filled cavity enclosed by the hollow profile restricts the passage of heat. The root platform, which rests directly against the stator casing, is subject to less thermal stress. This reduces the thermal conduction both via the contact surface and via the attachment element. Overall, this results in the stator casing temperature being lower. The accommodation of the attachment element or elements in the cavity furthermore protects them against the direct influence of the hot process gases which, not least, also increases the reliability of the connection, and thus safety. Since, in this solution, the attachment element does not occupy any additional space in front of and behind the vane body, the axial extent of the root platform is limited to the size governed by the vane body. Thus the invention does not suffer from the disadvantage of lengthening of the turbines with screwed-on stator vanes, over those with stator vanes that are held with a guided joint.

The root platforms and attachment elements have no effect on the channel flow.

Finally it is feasible to apply a cooling medium deliberately to the cavity, and thus provide additional protection against thermal stress in the stator casing and attachment elements.

BRIEF DESCRIPTION OF THE DRAWINGS

The drawings show a plurality of embodiments of the invention, highly schematically. Only those features which are essential to understanding of the invention are shown. Identical or mutually corresponding elements have the same reference symbols. In the figures.

DETAILED DESCRIPTION OF THE INVENTION

Figure 1:
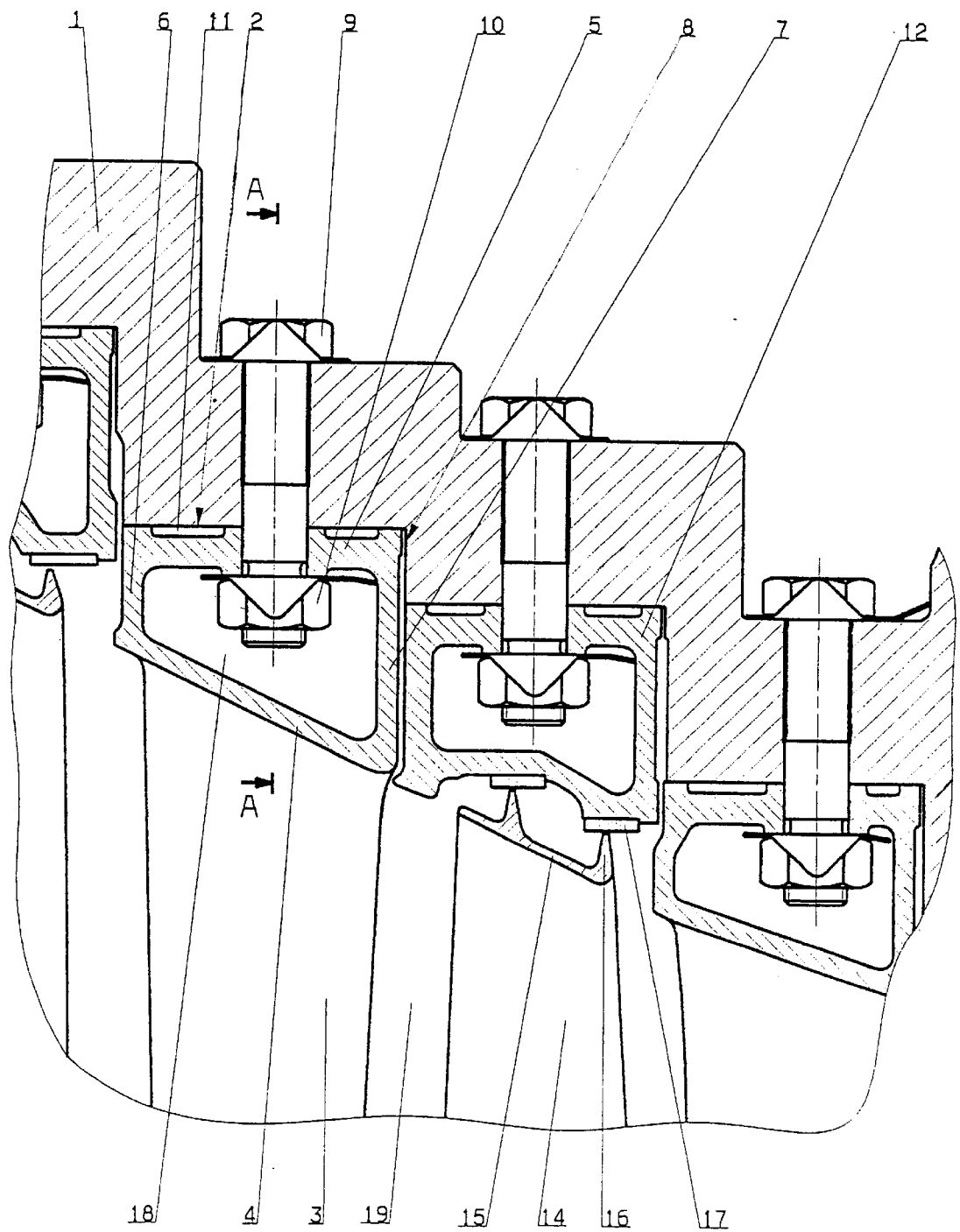
FIG. 1 shows a longitudinal section through a means for fixing a stator vane, according to the invention.

A blade system shown in FIG. 1 alternately comprises rows of rotor blades (14) and stator vanes (3) in a conically expanding flow channel (19), surrounded by the stator casing (1). The rotor blades (14), which are anchored in the rotor (not shown) are fitted with covering strip elements (15) at their blade tips. On their upper face, the covering strip elements (15) have sealing ribs (16) which run parallel to the direction of rotation and run against sealing strips (17) on a heat shield (12) that is connected to the stator casing (1).

Figure 2:
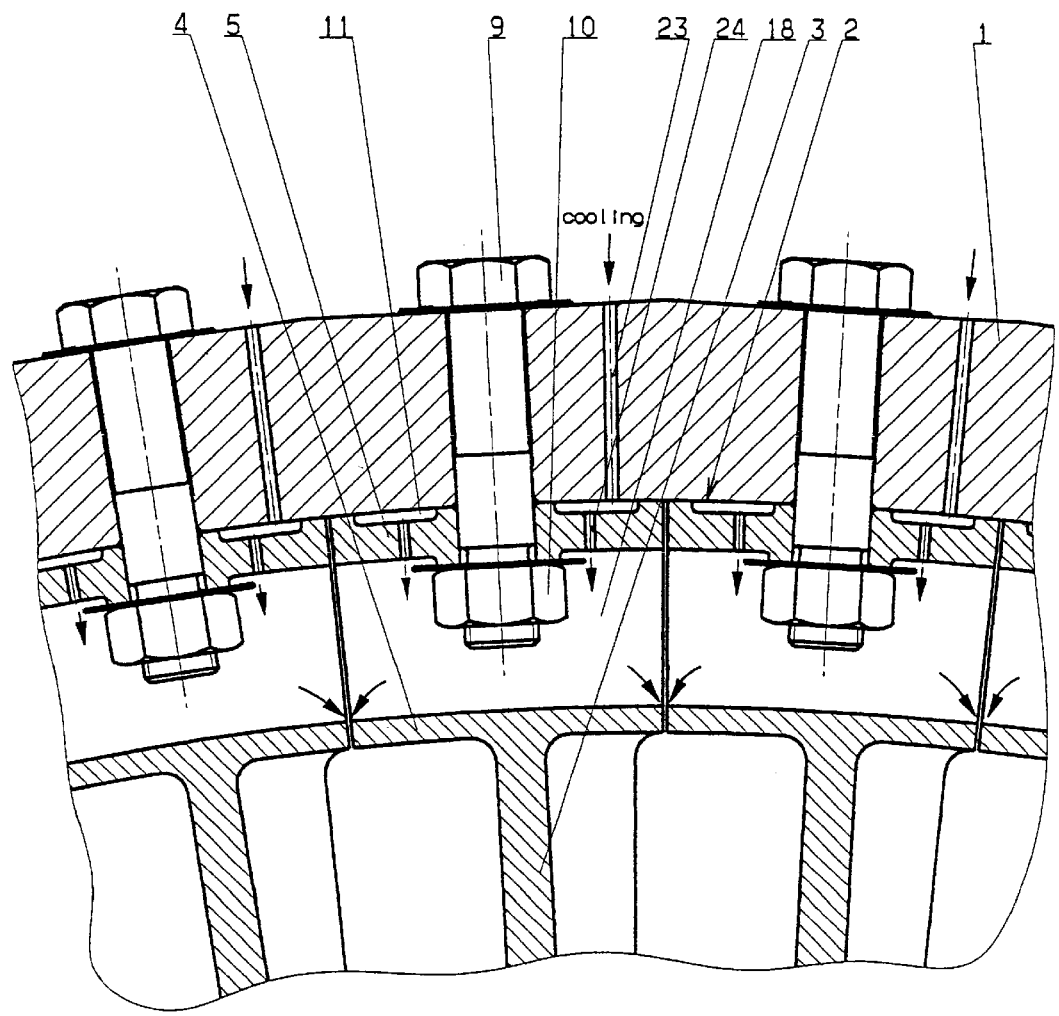
FIG. 2 shows a cross-sectional illustration along the line A—A shown in FIG. 1.

The conically expanding stator casing (1) is constructed in the form of steps, comprising a plurality of cylindrical sections (2) of increasing diameter. These cylindrical sections (2) communicate in their radial and axial extent with the rows of blades (3) and (14). Each of these sections (2) is alternately fitted with a stator vane (3) or heat shield (12), so as to produce an approximately continuous, conical channel internal contour. The root of the stator vane (3) forms a hollow profile, comprising a radially inner root plate (4) and a radially outer root platform (5), connected by parallel sidewalls (6) and (7) running transversely with respect to the flow direction. The radially inner platform (4) has an inclination which communicates with the conicity of the flow channel (19). The downstream wall (6) is thus generally shorter than the wall (7), so that the cavity (18) that is formed for each stator row has a more or less pronounced trapezoidal to approximately triangular cross-sectional shape. The root platforms (4) of adjacent vanes (3) abut against one another and form a continuous, approximately closed channel wall in each row of vanes (3), as can be seen from FIG. 2. The radially outer root platform (5) rests on the cylindrical region (2) of the stator casing (1). Recesses (11) on the platform surface (5) and/or casing surface (1) reduce the amount of heat transmitted. The stator casing (1) and platform (5) have coaxial through-holes for an attachment screw (9). The screw shank which passes through the stator casing (1) from the outside projects into the cavity (18) enclosed by the hollow profile, where it interacts with a threaded nut (10). The term threaded nut (10) should not be regarded in a narrow sense here. For example, it may also in this case be an insert integrated in the root platform and having a threaded hole. When the screw (9), (10) is tightened, the stator vane (3) is connected to the stator casing (1) with a force fit and a positive lock. In addition to being fixed by the attachment screw (9), the vane (3) is also held by the positive lock with the wall of the stator casing (1) in the region of the contact surface (8). The protected arrangement within the cavity (18) means that the screw shank (9) and the threaded nut (10) are largely removed from the influence of the process gases. At the same time, they cannot exert any negative influence on the flow conditions in the flow channel (19). The channel inner wall has a largely smooth contour. Coolant can be fed into the cavity (18) by means of channels (23) made in the stator casing (1) and of channels (24) made in the root outer platform (5).

Figure 3:
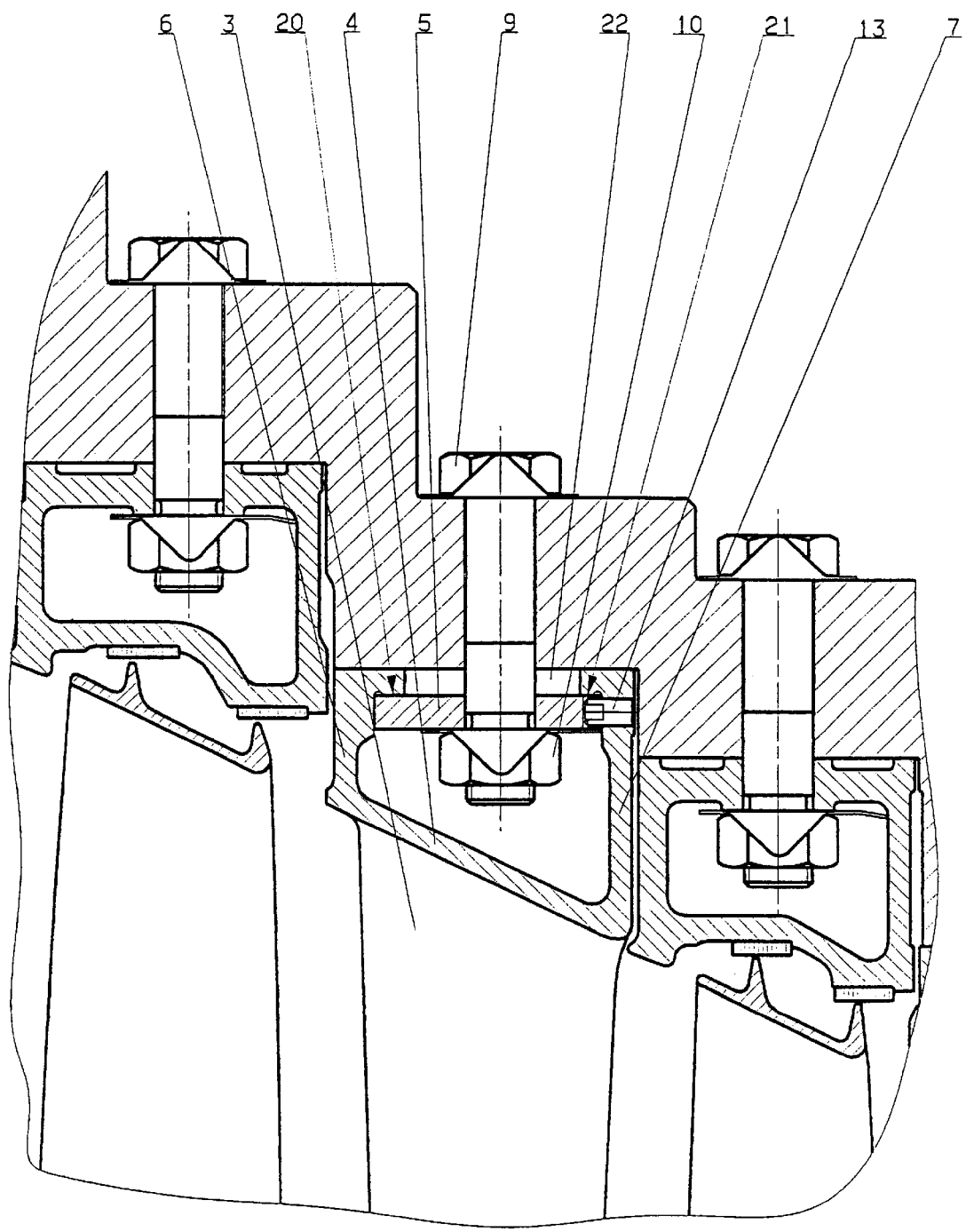
FIG. 3 shows a longitudinal section of an alternative embodiment.

The embodiment shown in FIG. 3 differs from that shown in FIG. 1 in that the platform (5) is no longer an integral component of the stator vane root, but is produced separately from it, as a separate element, and it inserted in the profile only during assembly. This embodiment has advantages particularly in production, in conjunction with the use of vanes with internal cooling. This measure simplifies the process of casting and fitting these vanes.

In this case, the outer ends of the walls (6) and (7) are bent inward at right angles in order to form two contact surfaces (20) and (21), lying in the same plane, for the plate (5) which is to be inserted. A gap (22) which reduces the heat transfer is in this case formed between the stator casing (1) and the root platform (5), depending on the wall thickness above the contact surfaces (20) and (21). The outer platform (5) is then inserted into the hollow profile of the vane root during the assembly process, or, in a kinematically reversed manner, the hollow profile is pushed over the plate (5), which is connected loosely to the attachment screw (9). The root plate (5) can be fixed in the hollow profile by using a locking pin (13).

Figure 4:
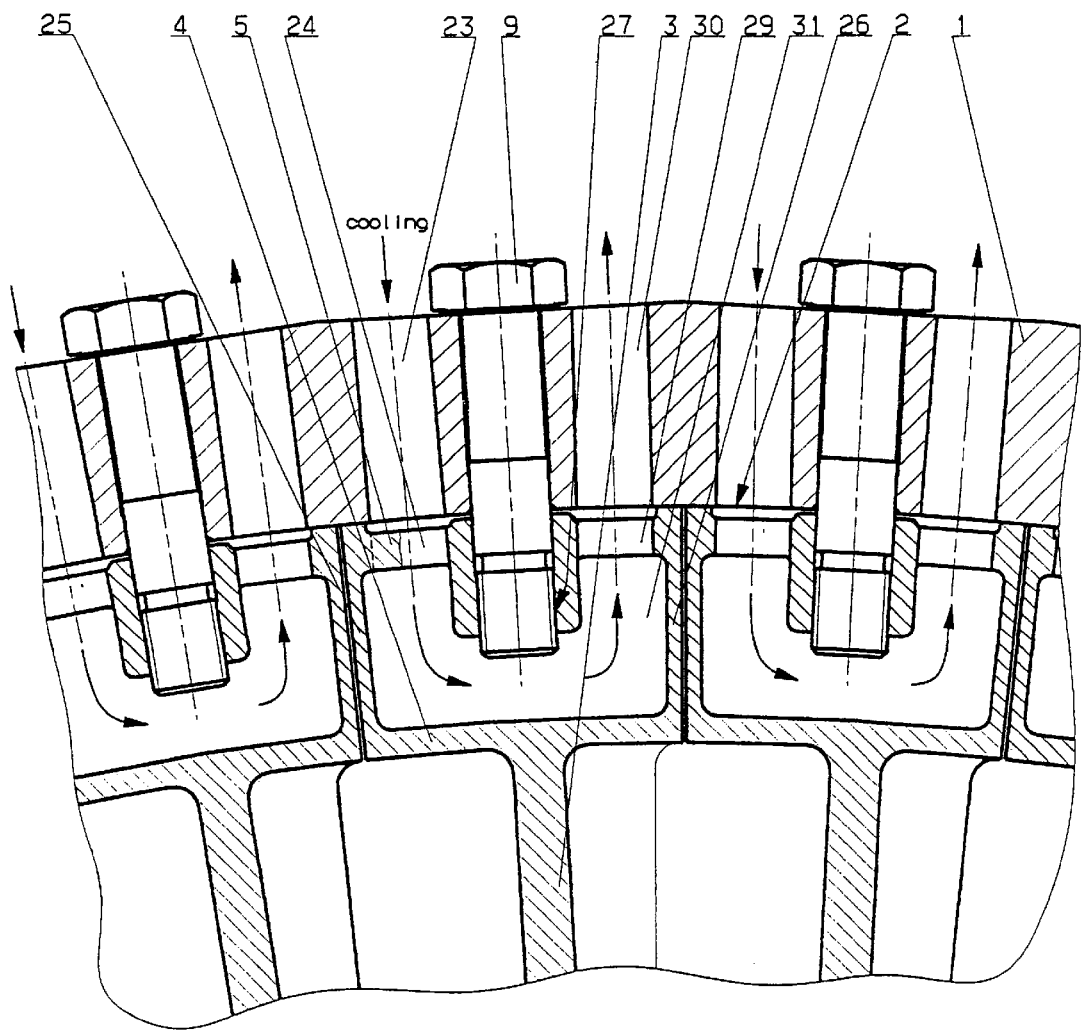
FIG. 4 shows a cross-sectional illustration along the line A—A shown in FIG. 1 of another alternative embodiment.

An embodiment of the vane (3) root is shown in FIG. 4 where crosspieces (25) and (26) connect vane walls (6) and (7) (FIG. 1) one to another and adjoin to the inner root platform surface (4). Thus, the cavity (31) is formed between two walls (6), (7), two crosspieces (25), (26), inner root platform (4) and surface of the cylindrical casing section (2). Due to formation of tight fitting the walls (6), (7) and crosspieces (25), (26) to the surface of the cylindrical casing section (2), and due to tightening of this joint by threaded connection implemented in the platform (5) and consisting of the screw (9) and the threaded hole (27) a sufficiently sealed connection can be created in this joint. This allows the walls of cavity (31) to be cooled virtually without any loss of coolant. To feed coolant into the cavity (31), inlet channels (23) are made in the casing (1), and inlet channels (24) are made in the platform (5). Appropriate channels (29), (30) are provided for discharge of coolant.

Figure 5:
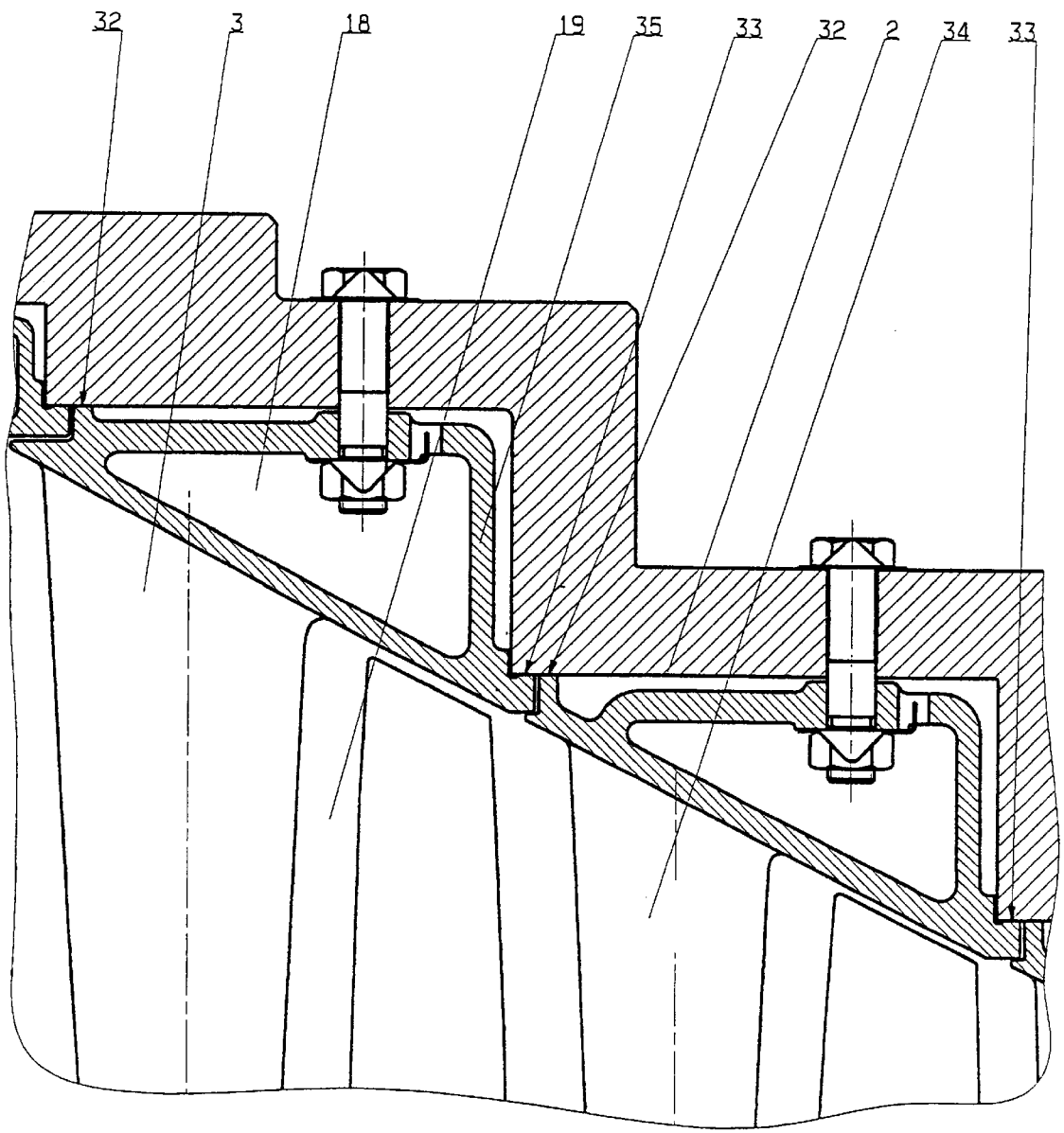
FIG. 5 shows a longitudinal section of a third alternative embodiment of a means for fixing a stator vane.

Still another embodiment of the vane (3) root is shown in FIG. 5 where bearing surfaces (32), (33) are made at different radial levels. Each of these surfaces made in the same vane is conjugated with various cylindrical surfaces of casing sections. In addition, both bearing surfaces (33) of the vane (3) and bearing surfaces (32) of the vane (34) are situated on the same cylindrical surface of the stator section. This allows the vane (35) root wall and the situated oppositely wall of stator (1) to be brought out of the hot zone effected by the flow channel (19), and thereby heating of these walls to be reduced.

Figure 6:
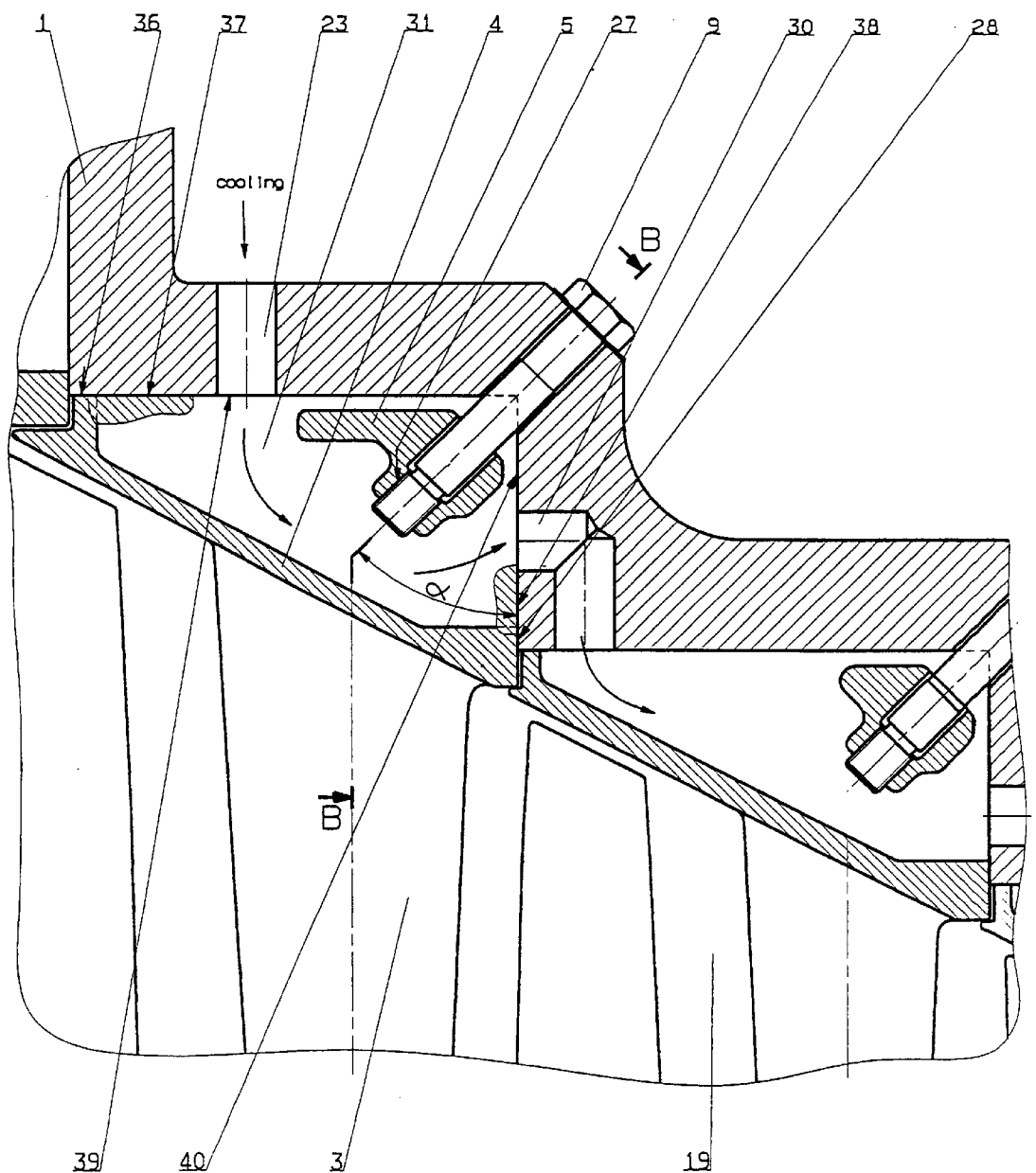
FIG. 6 shows a longitudinal section of a fourth alternative embodiment.
Figure 7:
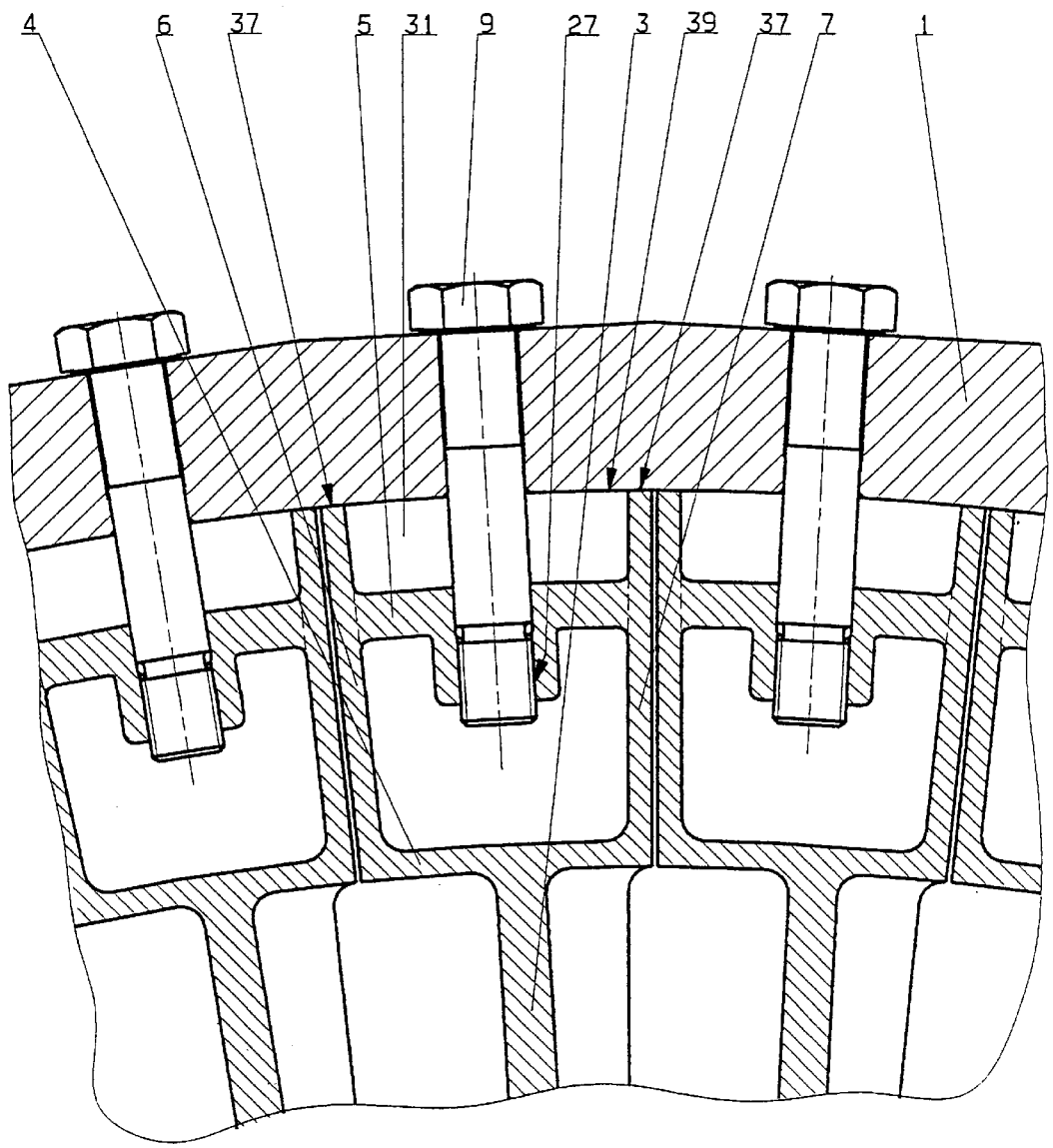
FIG. 7 shows a cross-sectional illustration along the line B—B shown in FIG. 6.

One further embodiment of the vane (3) root is shown in FIG. 6 where walls (6) and (7) (FIG. 7)are arranged in parallel to the longitudinal axis of stator (1). Bearing surfaces (37) and (38) of walls (6) and (7) adjoin simultaneously to the cylindrical surface (39) and to the end surface (40) of the stator casing (1). The inner root platform (4) adjoins also to above mentioned surfaces of stator casing section at contact surfaces (36) and (28). Thus, side walls (6) and (7), the inner root wall (4), the cylindrical surface (39) and the end surface (40) form a sufficiently sealed cavity (31) that is virtually completely separated out of hot gases passing through the flow channel (19). A fastening element (9) can be arranged close by the line of intersection between the cylindrical surface (39) and the end surface (40) of stator casing (1) and is inclined at the angle α to the end surface (40) that allows for providing simultaneous pressure of the above mentioned bearing surfaces (37), (38) and contact surfaces (36) and (28) to surfaces (39), (40) of casing section. The threaded hole (30) for a fastening element is situated directly in the outer root platform (5). This embodiment allows also making an inlet channel (23) and the outlet channel (27) in the stator casing (1) to feed and to discharge coolant for cooling internal surfaces of stator walls and of vane root parts. In this case there exist virtually no coolant leakage from the cavity (31) into the flow channel (19). possibility of transferring the design of stator vane root according to the invention, creating hollow profile, to accommodate the attachment elements, to other components with comparable operating conditions as well, in particular in the turbomachine field. For example, without departing from the scope of the invention, a heat protective shield screwed to the stator wall can thus be designed in an analogous manner as a hollow profile with an inner platform matched to the channel contour and an outer platform fixed to the casing by means of an attachment element.

LIST OF REFERENCE SYMBOLS

1 Stator casing
2 Cylindrical casing sections
3 Stator vane
4 Radially inner root platform
5 Radially outer root platform
6 Wall on the vane root
7 Wall on the vane root
8 Contact surface
9 Screw
10 Threaded nut
11 Recesses
12 Heat shield
13 Pin
14 Rotor blade
15 Covering strip element
16 Sealing ribs
17 Sealing strips
18 Cavity
19 Flow channel
20 Contact surface
21 Contact surface
22 Gap
23 Inlet channel in the stator casing
24 Inlet channel in the outer root platform
25 Crosspiece
26 Crosspiece
27 Threaded hole
28 Contact surface
29 Coolant discharge channel in the outer root platform
30 Coolant discharge channel in the stator casing
31 Vane root cavity
32 Bearing surface
33 Bearing surface
34 Stator vane
35 Vane root wall
36 Contact surface
37 Bearing surface
38 Bearing surface
39 Cylindrical surface of the casing section
40 End surface of the casing section

What is claimed is:

1. A stator vane for an axial flow turbine having a flow channel which expands conically and has a root platform which is connected with a force fit and a positive lock to the stator casing, wherein
   the stator vane root is in the form of a hollow profile, comprising a radially inner root platform which is matched to the contour of the flow channel, and, at a distance from it, a radially outer root platform, matched to the contour of the stator casing as well as one or two essentially parallel sidewalls, wherein the outer platform is equipped with at least one hole for accommodating an attachment element by which the vane is fastened to the stator casing.

2. The stator vane as claimed in claim 1, wherein the contact surface between the root platform and the stator casing has recesses.

3. The stator vane as claimed in claim 2, wherein the surface of the root platform is provided with said recesses.

4. The stator vane as claimed in claim 3, wherein the bearing surfaces of the same stator vane are made at different radial levels and matched with different surfaces of cylindrical casing sections, bearing surface of one stator vane and bearing surface of another stator vane being arranged in one cylindrical casing section.

5. The stator vane as claimed in claim 1, wherein the outer platform is detachably connected to the vane root.

6. The stator vane as claimed in claim 5, wherein the radially outer ends of the sidewalls of the vane root are bent at least approximately at right angles inward, and form two contact surfaces lying in parallel planes, for contact with the outer root platform.

7. The stator vane as claimed in claim 1, wherein means are provided for applying a cooling medium to a cavity in an installed state.

8. The stator vane as claimed in claim 7, wherein means is provided to discharge coolant from the cavity in the installed state.

9. The stator vane as claimed in claim 1, wherein two crosspieces are provided between the sidewalls.

10. The stator vane as claimed in claim 9, wherein end surfaces of sidewalls and of crosspieces turned to the surface of cylindrical casing section tightly adjoins to said surface of cylindrical casing section, and together with inner root platform they form a cavity essentially tightly separated from the flow channel.

11. The stator vane as claimed in claim 10, wherein means is provided to feed coolant into the cavity in an installed state.

12. The stator vane as claimed in claim 11, wherein means is provided to discharge coolant from the cavity in the installed state.

13. The stator vane as claimed in claim 1, wherein sidewalls are arranged parallel to the longitudinal axis of the stator, and first bearing surfaces of the sidewalls adjoin the cylindrical surface and second bearing surfaces of the sidewalls adjoin an end surface of the stator casing;

the sidewalls, together with the inner root platform form a cavity essentially tightly separated from the flow channel, and the attachment element is inclined at an angle to the end surface of the stator casing to ensure simultaneous pressing of the first and second bearing surfaces against the cylindrical surface and the end surface.

\* \* \* \* \*